Patented Jan. 1, 1952

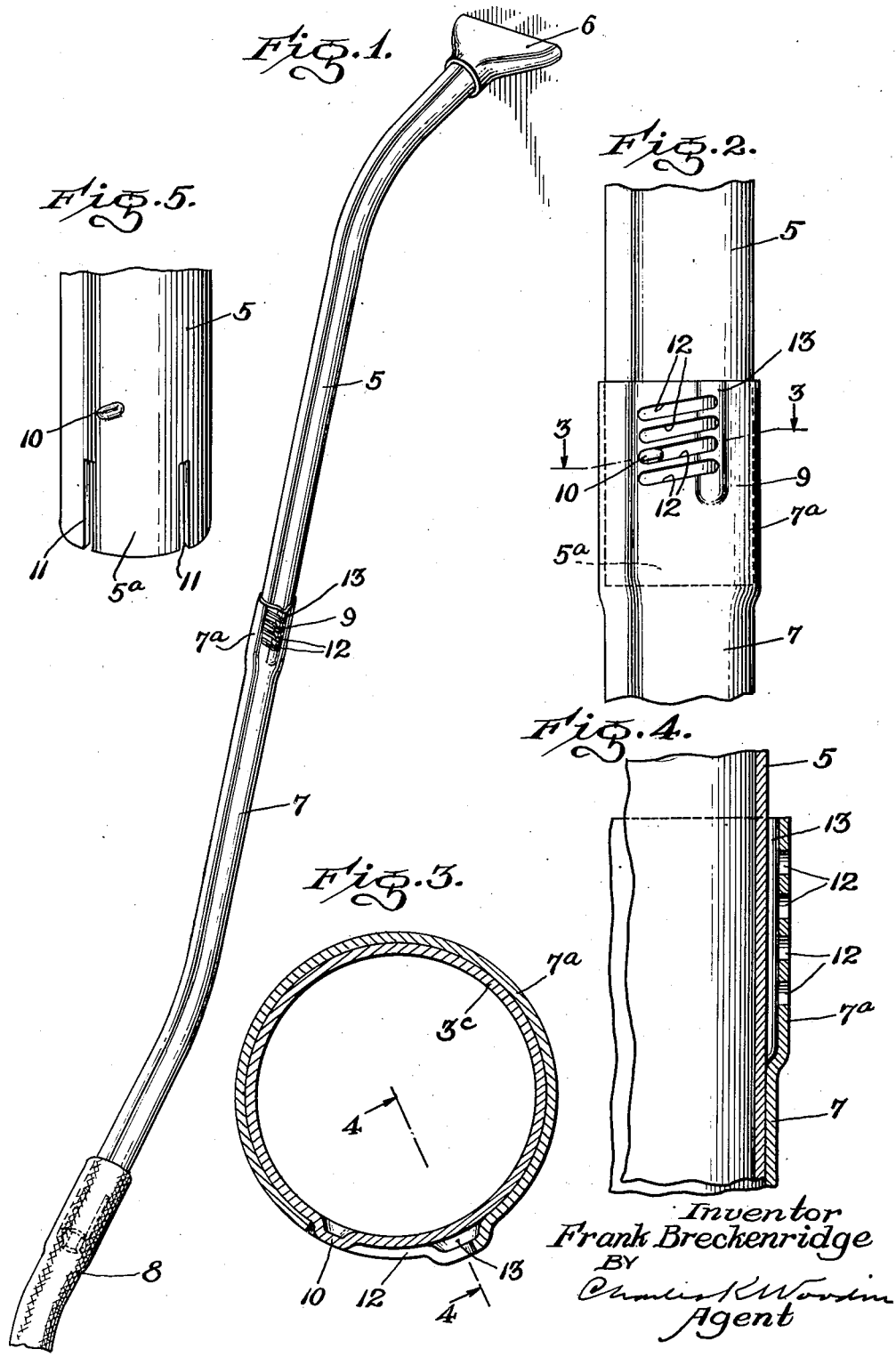

2,580,725

UNITED STATES PATENT OFFICE 2,580,725

APPLIANCE HANDLE JOINT

Frank Breckenridge, Newton, Iowa, assignor to Automatic Washer Company, Newton, Iowa, a corporation of Delaware Application May 4, 1948, Serial No. 25,036

1 Claim. (Cl. 285—175)

This invention relates to a jointed handle for household appliances or the like and concerns itself with a novel joint whereby the parts of the handle may be readily disconnected after use for compact storage and in which the handle parts may be readily connected when it is desired to again put the appliance into use.

It is an object of this invention to provide a joint that will always provide a tight and rigid connection irrespective of wear or tear upon the handle parts, that is susceptible of being locked in different positions of adjustments and in which the joint is tightened during the locking operation.

The invention comprises the novel structure and combination of parts hereinafter described and more particularly pointed out and defined in the appended claim.

In the accompanying drawing which illustrates a preferred form of this invention and in which similar reference numerals refer to similar features in the different views:

Fig. 1 is an elevational view of a handle involving this invention;

Fig. 2 is an enlarged fragmentary elevational view illustrating the joint;

Fig. 3 is an enlarged sectional view taken upon the line 3—3 of Fig. 2;

Fig. 4 is a fragmentary sectional view upon an enlarged scale taken upon the line 4—4 of Fig. 3; and Fig. 5 is a fragmentary elevational view of one section.

In referring now to the drawing, there is shown a handle comprising an upper section 5 having a hand piece 6 and a lower section 7 which may be connected to an appliance by any suitable connector 8. The handle sections are preferably of tubular form and made of suitable metal having some resiliency for a purpose that will later appear. The two sections are removably connected by a joint generally denoted by the reference numeral 9.

The joint 9 is formed by the two telescopic adjacent parts of the handle sections, in the following manner. One of the handle sections, the handle section 5 in the present instance, is provided with a split lower end 5a best shown in Fig. 5 and a sloping locking lug 10 located slightly above the split end which it will be noted is formed by suitable slots 11 in the lower end of the section 5.

The split end of the section 5 telescopes within the upper end 7a of the section 7. This upper end of the section 7 is slightly enlarged and provided with transversely extending slots 12 which slope inwardly from the adjacent end thereof. The upper end 7a of this lower section is provided with an outwardly directed groove 13 at the right hand end of the slots 12 as viewed in Figs. 2 and 3. This groove 13 is designed to form a passageway for the lug 10 as will presently appear. The groove 13 may best be formed by punching the wall of the section outwardly as shown in the drawing.

In Figs. 2 and 3, the lug 10 is shown in the third slot 12 from the end of the section 7 and to the left of the groove 13 illustrating the two handle sections in connected and locked positions. Now to disconnect the handle sections, it is only necessary to relatively rotate the same to bring the lug 10 into the groove 13 when the two sections can be readily separated or pulled apart.

To connect the two handle sections, the handle section 5 should be inserted in the section 7 with the lug 10 in alignment with the groove 13, and pushed inwardly as far as ordinary effort can. Then relative rotation should be imparted to the two sections to force the lug 10 to travel in one of the slots 12 in a direction away from the groove 13. As the lug thuswise travels in a groove 13, it will move inwardly and tend to draw the section 5 further into the section 7 and cause a tight joint in which the two parts are locked together. As there are a plurality of slots 12 for receiving the locking lug 10, a large range of wear or looseness can be taken up. The slope of the slots 12 serve to apply the final tightening adjustment.

It is hence characteristic of this invention that it is susceptible of providing a tight and strong joint under any normal conditions of wear or tear in which the major adjustment is accomplished by a telescopic movement and the final tightening adjustment is accomplished by a rotational movement.

I am aware that many changes may be made and various details of construction may be modified without departing from the principles of this invention, so I do not propose limiting the patent granted otherwise than necessitated by the appended claim.

I claim:

A hollow handle comprising two sections, one section having a split end with a sloping lug stamped therefrom above the split portion and the other section having an enlarged end having an outwardly pressed rib extending from the end thereof for forming an interior groove for receiving said lug, and transversely sloping slots extending from the medial line of said rib in spaced relation for receiving said lug through relative rotation of said sections, said sloping lug and sloping slots serving to draw said sections in tight telescopic relation by contracting the split end portion of the first section.

FRANK BRECKENRIDGE.

REFERENCES CITED

The following references are of record in the file of this patent:

UNITED STATES PATENTS

| Number | Name | Date |
|---|---|---|
| 512,457 | Stone | Jan. 9, 1894 |
| 806,665 | Henderson et al. | Dec. 5, 1905 |
| 2,099,984 | Lundquist | Nov. 23, 1937 |
| 2,201,274 | Singer | May 21, 1940 |
| 2,480,578 | Hodges | Aug. 30, 1949 |